United States Patent [19]

Staar

[11] Patent Number: 4,679,183

[45] Date of Patent: Jul. 7, 1987

[54] SOUND RECORDING APPARATUS FOR BLANK FILMS AND TAPES

[75] Inventor: Marcel Staar, Brussels, Belgium

[73] Assignee: Staar Development Company S.A., Brussels, Belgium

[21] Appl. No.: 761,833

[22] Filed: Aug. 2, 1985

[30] Foreign Application Priority Data

Aug. 7, 1984 [BE] Belgium .................................. 900.312

[51] Int. Cl.⁴ ............................................. G11B 11/18
[52] U.S. Cl. .................................... 369/84; 346/76 L; 369/100; 264/106
[58] Field of Search ............. 346/76 L, 77 E; 369/84, 369/100, 103, 154; 358/347, 344; 365/126; 264/106

[56] References Cited

U.S. PATENT DOCUMENTS

| 3,689,692 | 9/1972 | Ih ........................................... 358/344 |
| 3,716,286 | 2/1973 | St. John .............................. 369/103 |
| 3,732,363 | 5/1973 | Glenn .................................... 369/84 |
| 4,383,261 | 5/1983 | Goldberg .......................... 346/76 L |

Primary Examiner—Alan Faber
Attorney, Agent, or Firm—Leydig, Voit & Mayer

[57] ABSTRACT

An apparatus and method for reproducing sound recordings on blank films and tapes of plastic materials in which a continuous master film carrying sinuous lines of imprint containing the sound recordings to be reproduced are pressed against a blank tape as both the master film and blank tape are moved continuously at a constant speed and in synchronism past a pressure applying station. A laser is provided to emit a very fine and precise laser heat beam to heat and soften local zones of the blank tape a fraction of a second before being aligned to receive the imprints.

7 Claims, 4 Drawing Figures

SOUND RECORDING APPARATUS FOR BLANK FILMS AND TAPES

TECHNICAL FIELD

The present invention relates to sound recordings and, more particularly, to an apparatus and method for reproducing sound recordings on blank films and tapes of plastic materials.

BACKGROUND ART

It is known that sound recordings can be reproduced on motion picture films or tapes by optoelectrical or magnetic means. Light beam and electrical signals representing the sound recordings to be reproduced are magnetically coupled onto the blank films or tapes in the forms of optical or magnetic tracks.

While these reproductive processes offer a quick and reliable way to reproduce sound recordings, they often require complicated and expensive equipment, thereby increasing the cost of production dramatically.

Accordingly, the technique using mechanical grooves has been proposed as an alternative for the sound recording reproduction process. It is recognized that sound recordings can be represented in the form of mechanical imprints on a film or tape and these imprints can be easily reproduced on blank films and tapes, especially when these films and tapes are made of plastic materials. This process requires relatively inexpensive and imprecise sound reproducing equipment and provides the reproduced films and tapes the advantage of being readable by simple needle pickups.

On the other hand, due to the structure and length of the films and tapes, the grooves must be imprinted individually, thereby imposing very restricting limitations on production speed even when several machines are incorporated to produce a certain number of recorded tapes simultaneously.

DISCLOSURE OF THE INVENTION

It is, therefore, an object of the present invention to provide a method and apparatus for reproducing sound recordings and other types of information at great speed.

It is another object of the invention to provide simple means for reproducing precise duplicate copies.

BRIEF DESCRIPTION OF THE DRAWINGS

Other objects, features and advantages of the present invention will become apparent from the following detailed description and accompanying drawings wherein.

BEST MODE FOR CARRYING OUT THE INVENTION

Figure 1:
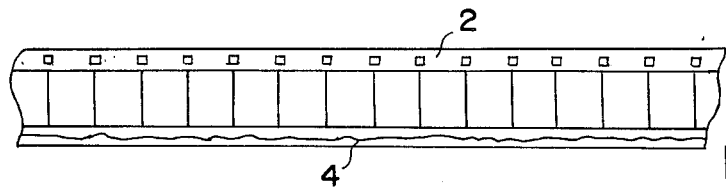
FIG. 1 shows a motion picture film having mechanical grooves corresponding to simple or stereoscopic sound recordings.

Referring to FIG. 1, there is shown a motion picture film 2 having a single imprinted sinuous mechanical groove 4 using the apparatus disclosed in the present invention. This groove line 4 represents the sound recordings corresponding to the sound recordings for the picture film 2.

Figure 2:
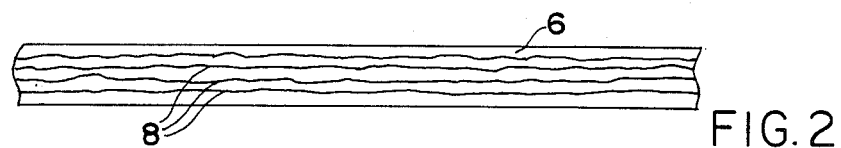
FIG. 2 shows a tape of plastic material bearing multiple grooves.

FIG. 2 shows a section of a tape 6 with multiple imprinted grooves 8 representing multiple sound tracks that could be read simultaneously or individually.

Figure 3:
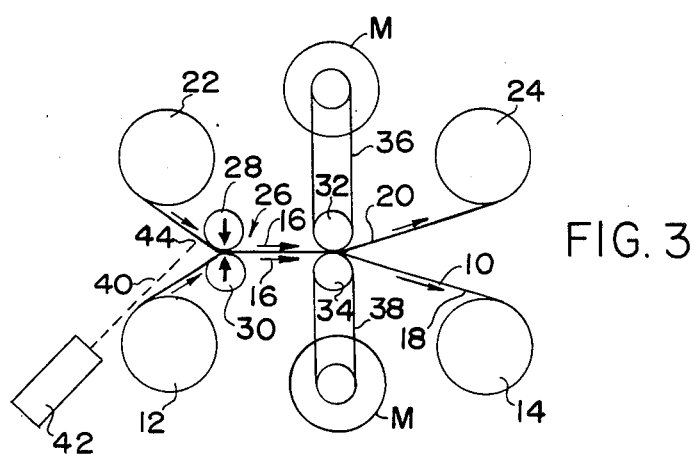
FIG. 3 shows an embodiment of the present invention.

In carrying out the invention, an embodiment of the apparatus for reproducing sound recordings is shown in FIG. 3. As can be seen, a continuous master film 10 is reeling off reel 12 toward reel 14 in the direction of the arrows 16. This master film 10 includes very fine and precise sinuous lines of imprints 18 containing the sound recordings to be reproduced. The number of sinuous lines can be one, as in the case of FIG. 1, or several, as in the case of FIG. 2, depending on how the duplicated tapes are used, i.e., along with motion pictures or solely sound recordings that can be read simultaneously. On the opposite side of the master film 10 a blank tape 20 formed of or coated with a heatformable plastic material is reeling off reel 22 toward reel 24 in the same direction of arrows 16. Both the master film 10 and the blank tape 20 are continuously moved in synchronism past a pressure applying station 26 having rolls 28 and 30 on both sides of the master film 10 and the blank tape 20. These rolls 28 and 30, when driven, press one film against the other to transfer the sinuous lines of imprints 18 on the master film 10 onto the blank tape 20. Pull rolls 32 and 34 which are positioned adjacent the pressure applying station 26 are connected to a motor M by belts 36 and 38, respectively, for moving the master film 10 and the blank tape 20 in synchronism and at a constant speed. It is clearly recognized that reels 22 and 24 can also be electrically connected to the motor M to move the master film 10 and the blank tape 20 in the direction of arrows 16, and the pull rolls 32 and 34 simply serve as balancing rollers.

In keeping with the invention, a laser beam 40 emitted from a laser 42 is provided for heating to soften local zones 44 of the blank tape 20 immediately prior to entering the pressure applying station 26. As recognized, the imprints 18 representing sound recordings on the master film 10 are very fine and precise. Therefore, when these imprints 18 are pressed against the blank tape 20, the impressions will wear out and deteriorate rapidly, thereby substantially degrading the quality of the sound recordings that are reproduced. Henceforth, it is necessary to reduce and eliminate this deterioration by heating to soften the local zones 44 of the blank tape 20 linearly aligned to receive imprints from the master film 10. Accordingly, the laser 42 provides a laser heat beam 40 striking the blank tape 20 a very short time (usually a fraction of a second) before the imprints on the master film 10 are pressed onto the blank tape 20. The laser 42 is practically used for its fine beam and precision in softening only the local zones 44 corresponding effectively to the imprints without the risk of damaging the characteristics and quality of the master film 10. This is especially critical in the case of reproducing sound recordings on motion picture films 2 (such as those shown in FIG. 1) where the films also contain visual effects. It is, however, recognized that other heating sources could be used to soften the blank tape 20.

Figure 4:
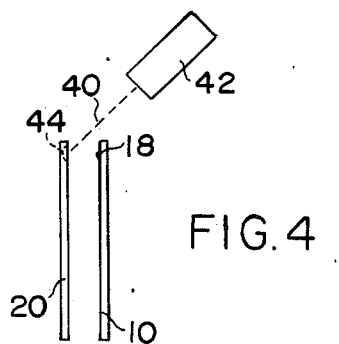
FIG. 4 shows a section of the master film bearing a sinuous relief line to be pressed against a corresponding section of the blank tape.

FIG. 4 shows a more detailed illustration on how the laser 42 is arranged relative to the master film 10 and the blank tape 20. As can be seen, the master film 10 includes a line of imprints 18 facing toward the blank tape 20. The laser 42 provides a laser heat beam 40 striking local zones 44 of the blank tape 20 directly corresponding to the imprints 18. As the films 10 and 20 are pressed against each other (at the pressure applying station 26) only the zones 44 are softened and linearly aligned to receive imprints 18.

In keeping further with another aspect of the invention, a method for reproducing sound recordings on blank films and tapes of plastic materials is provided. In accordance with the invention, the method comprises:

(a) providing a continuous master film having imprints containing the sound recordings to be reproduced, (b) transferring the imprints on the master film onto the blank film including pressing one film against the other and moving the films continuously and in synchronism past a pressure applying station, and (c) heating to soften only local zones of blank film entering the pressure applying station and aligning these zones to receive imprints from the master film.

As noted, the imprints 18 on the master film 10 are in the form of single or multiple sinuous grooves to be juxtaposed to the blank film 20 and the heating is performed by a laser beam 40 emitted from a laser 42 to strike the blank film 20 a fraction of a second before the imprints 18 are pressed onto the blank film 20.

From the foregoing description, those skilled in the art should readily understand the construction and operation of the invention and realize that it accomplishes its objects. While one complete embodiment of the invention has been disclosed in detail, it is to be distinctly understood that the invention is not limited to the details of the foregoing disclosure, but, on the contrary, such modifications and variations thereof as may suggest themselves to those skilled in the art, without departing from the spirit of the invention, are contemplated by and within the scope of the appended claims.

What is claimed is:

1. An apparatus for reproducing sound recordings on blank films and tapes of plastic materials comprising:
    (a) a continuous master film having imprints containing the sound recordings to be reproduced;
    (b) reproducing means for transferring the imprints on said master film onto blank film including means for pressing one film against the other and for moving said films continuously and in synchronism past a pressure applying station;
    (c) heating means directing heat against the blank film and not the master film for heating to soften only local zones of the blank film which will receive the imprints a fraction of a second before the imprints in said master film and the local zones of the blank film are pressed together in the pressure applying station, said local zones being linearly aligned to receive the imprints from said master film.

2. An apparatus according to claim 1 in which said imprints are in the form of sinuous grooves to be juxtaposed to said blank film, and said heating means softens local zones linearly aligned to receive said sinuous grooves.

3. An apparatus according to claim 1 in which said heating means includes a laser providing a laser heat beam striking on said blank film a fraction of a second before said imprints on said master film are pressed onto the film.

4. An apparatus according to claim 1 further including pull rolls for moving said films in synchronism past said pressure applying station.

5. A method for reproducing sound recordings on blank films and tapes of plastic materials comprising:
    (a) providing a continuous master film having imprints containing the sound recordings to be reproduced;
    (b) transferring the imprints on said master film including pressing one film against the other and moving said films continuously and in synchronism past a pressure applying station; and
    (c) heating the blank film and not the master film to soften only local zones of the blank film which will receive the imprints a fraction of a second before the imprints in said master film and the local zones of the blank film are pressed together in the pressure applying station and aligning said zones to receive the imprints from said master film.

6. A method according to claim 5 in which said imprints are in the form of multiple sinuous grooves to be juxtaposed to said blank film.

7. A method according to claim 5 in which said heating is performed by a laser beam striking said blank film a fraction of a second before pressing said imprints on said master film onto said blank film.

* * * * *